United States Patent [19]
Di Salvo et al.

[11] 3,934,301
[45] Jan. 27, 1976

[54] DEVICE FOR CLEANING THE HEADLIGHT GLASS ON MOTOR VEHICLES

[75] Inventors: Salvatore Di Salvo, Turin; Mario Moriondo, Testona-Moncalieri (Turin), both of Italy

[73] Assignee: Fiat Societa per Azioni, Turin, Italy

[22] Filed: July 25, 1974

[21] Appl. No.: 491,704

[30] Foreign Application Priority Data
Aug. 31, 1973   Italy ................................. 69600/73

[52] U.S. Cl. ........... 15/250.22; 15/250 A; 240/7.1 R
[51] Int. Cl.² ............................................ B60S 1/44
[58] Field of Search ........ 15/250.22, 250 A, 250.29, 15/250.30; 240/7.1 R, 46.07

[56] References Cited
UNITED STATES PATENTS

| | | | |
|---|---|---|---|
| 1,269,395 | 6/1918 | Cranston | 15/250.22 |
| 2,100,055 | 11/1937 | Horton | 15/250.22 X |
| 2,634,447 | 4/1953 | Domek et al. | 15/250.22 |
| 3,493,804 | 2/1970 | Fennell | 15/250 A |
| 3,604,922 | 9/1971 | Steel | 240/46.07 |
| 3,624,857 | 12/1971 | Holzer | 15/250 A |

*Primary Examiner*—Peter Feldman
*Attorney, Agent, or Firm*—Sughrue, Rothwell, Mion, Zinn & Macpeak

[57] ABSTRACT

A device for cleaning the headlamp glass of an automobile headlamp. The device is formed in two main units, a motor unit and a reduction gear unit, which latter carries a wiper blade which, in use of the device, is moved over the surface of the glass to effect cleaning. The motor is mounted inside the headlamp and the gear unit outside, the two being connected together through a hole in the headlamp glass. A resilient seal is provided to make the joint waterproof and there are various arrangements for ensuring that the assembly is correctly centred within the hole in the glass and oriented properly in an angular sense.

9 Claims, 3 Drawing Figures

DEVICE FOR CLEANING THE HEADLIGHT GLASS ON MOTOR VEHICLES

BACKGROUND AND OBJECT OF THE INVENTION

The present invention relates to a device for cleaning the headlamp glass on automobiles, and particularly to a device of the type comprising a motor, a reduction gear unit, a wiper blade carried by the output shaft of the reduction gear unit, and conductors for the supply of electric current to the motor, in which the motor and the reduction gear unit are mounted directly on the glass of the headlamp.

Known arrangements of this type are of rather complicated structure and their assembly requires great attention to exact positioning of the motor unit and its mounting.

The object of the invention is to provide a device for cleaning an automobile headlamp glass, which is simple, strong, economical to manufacture, and the mounting of which is very easy.

SUMMARY OF THE INVENTION

According to this invention there is provided a device for cleaning the headlamp glass of an automobile headlamp, of the type comprising a motor, a reduction gear, a wiper blade carried by the reduction gear, and conductors for the supply of electricity to the motor, the motor and the reduction gear being adapted to be mounted directly on a headlamp glass, characterised in that the motor is adapted to be mounted inside the headlamp and connected to the reduction gear mounted outside the headlamp through an opening in the headlamp glass, there being provided means for attaching the motor and the reduction gear together, means for locating the assembly with respect to the opening in the headlamp glass, and means for sealing the opening in the headlamp glass.

Various other features and advantages of the invention will become clear from the following description with reference to the accompanying drawings, which is provided purely by way of non-restrictive example.

DESCRIPTION OF PREFERRED EMBODIMENT

Figure 1:
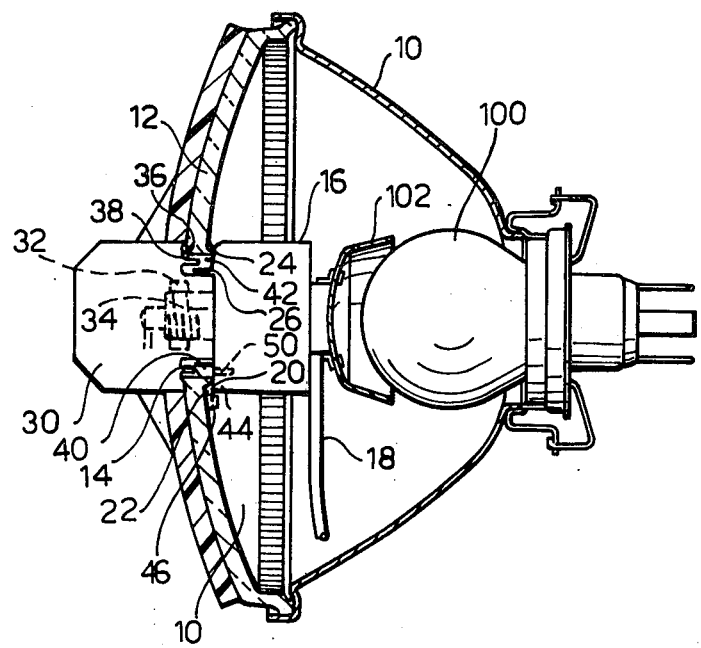
FIG. 1 is a cross section through a headlamp incorporating a first embodiment of the invention.

Referring now to FIG. 1, there is shown a headlamp generally indicated 10, for an automobile (not shown). The headlamp has a reflector 11, and a headlamp glass 12 in which there is an opening 14 which, in this embodiment, is located on the optical axis of the headlamp but which, in other embodiments, may be located in an off-axis position. When used in this specification the term "headlamp glass" will be understood to refer to the transparent front screen of a headlamp, whether it is, in fact, made of glass or any other suitable transparent material. The headlamp also has a lamp bulb 100 and a cap 102 of known function.

Inside the headlamp is located a motor 16, connected by a cable 18 to the electrical system of the vehicle (not shown); to the motor is rigidly connected an annular element having an annular flange 20 and a tubular axial part 26. The front surface 22 of the flange 20 engages the rim 24 of the opening 14 in the headlamp glass 12 and in the tubular axial part 26 there is located a reduction gear unit 30. A threaded bush 32 of the reduction gearbox unit 30 screws to a threaded sleeve 34 of the motor 16 thus clamping the headlamp glass 12 between the associated face 22 of the flange 20 and the edge of a face 36 of the reduction gear unit 30. Resilient O-rings 38 are also provided, both for ensuring a tight seal and for compensating any variations in thickness of the glass 12 to prevent this from fracturing under the clamping pressure. The tubular axial part 26 of the annular element and the edge of the opening 14 between them define an annular space 40 which is filled with an adhesive or resinoid material to assist in forming a seal between the exterior and interior of the headlamp.

The flange 20 is provided with at least two axially extending fins 42 for locating the motor centrally in the opening 14, and at least one radially extending fin 44 which engages between two studs 46 projecting from the glass 12, to ensure correct angular orientation with respect to the headlamp glass. Similarly there is at least one reference fin 50 for the motor.

Figure 2:
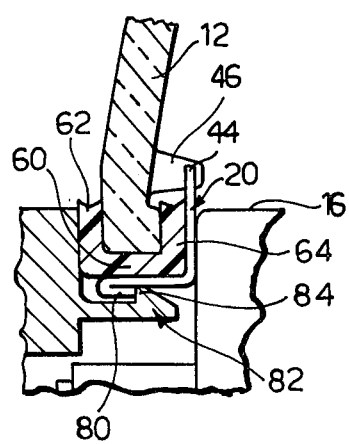
FIG. 2 is a cross section through a part of a second embodiment of the invention, illustrating how the headlamp glass is sealed.

In the embodiment shown in FIG. 2 the rim of the opening 14 in the headlamp glass is engaged by an annular channel section seal 60 in the form of a grommet effectively providing two lateral flanges 62, 64 which ensure a water-tight seal of the opening and provide for compensation of any differences in thickness of the glass to assist in sealing when the flange 20 on the motor and a cooperating face of the reduction gear unit are fixed together with the seal 60 and the rim of the opening 14 clamped between them. On the tubular axial part 26 of the annular element there is formed a folded rim 80 and the reduction gear unit carries a plurality of flexible fins 82, provided with hooked teeth 84 which engage in the folded rim 80 to hold the motor 16 and the reduction gear unit 30 together with the flanges 62, 64 of the annular seal 60 compressed between them and the rim 14 of the headlamp glass.

Figure 3:
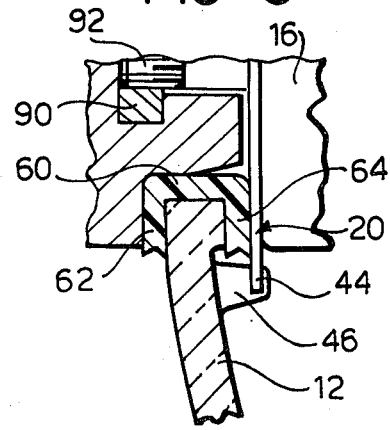
FIG. 3 is a cross section, similar to FIG. 2, of a part of a third embodiment of the invention.

In FIG. 3 there is shown a fixing system for holding together the motor 16 and the reduction gear unit 30 in which the annular element is in the form of a disc 20 with no axially extending tubular part and, as in the embodiment of FIG. 2, there is a channel section annular resilient sealing ring in the form of a grommet 60 having two annular flanges 62, 64 located in the rim of the opening 14 in the headlamp glass 12, with the flanges 62, 64 on opposite sides of the glass 12. The motor 16 has a threaded boss 92 which threadedly engages in a bush 90 carried by the reduction gear unit 30.

It will be appreciated that other types of connections could be provided and also, modifications could be made to the form and to the dimensions of the parts without thereby departing from the scope of this invention.

We claim:

1. In a device for cleaning the headlamp glass of an automobile headlamp, having:
   a motor,
   a reduction gear,
   a wiper blade carried by said reduction gear, and conductors for the supply of electricity to said motor, said motor and said reduction gear being adapted to be mounted directly on a headlamp glass, the improvement comprising:

means for attaching said motor and said reduction gear together through an opening in said headlamp glass such that said motor is located inside said headlamp and said reduction gear is located externally of said headlamp; means for locating said motor and said reduction gear with respect to said opening in said headlamp glass, and means for sealing said opening in said headlamp glass.

2. The device of claim 1, wherein said motor and said reduction gear are detachably connected together.

3. The device of claim 1 wherein said means to attach said motor and said reduction gear comprises a threaded sleeve attached to said reduction gear and a threaded boss attached to said motor and engaging said threaded sleeve.

4. The device of claim 1 wherein said locating means comprises a flange fixedly attached to said motor, which flange has at least two fins extending axially beyond the front face thereof for the purpose of centering said motor with respect to said opening in the headlamp glass.

5. A motor vehicle headlamp comprising:
a. a generally cup-shaped reflector;
b. a bulb located within the interior of said reflector;
c. a transparent lens attached to the preiphery of said reflector;
d. means connecting said bulb to a source of electricity;
e. a motor;
f. a reduction gear;
g. a wiper blade operatively connected to said reduction gear and bearing against the outer surface of said transparent lense;
h. means to connect said motor to a source of electricity;
i. means for attaching said motor and said reduction gear together through an opening in said transparent lens such that said motor is located inside said headlamp and said reduction gear is located externally of said headlamp;
j. means for locating said motor and said reduction gear with respect to the opening in said transparent lens; and
k. means for sealing said opening in said transparent lens.

6. The headlamp of claim 5 wherein said motor and said reduction gear are coaxial with the axis of said headlamp.

7. The headlamp of claim 5 wherein said motor and said reduction gear are provided with radial flanges of diameter greater than the diameter of the opening in the headlamp lens so as to clamp the headlamp lens between them.

8. The headlamp of claim 5 wherein said locating means comprises a flange fixedly attached to said motor and a tubular part extending generally perpendicular to said flange, said tubular part having a diameter less than the diameter of said opening in said headlamp lens and extending through said opening.

9. The headlamp of claim 8 wherein said locating means also has at least one radial projection which extends radially beyond the opening in the headlamp lens; and said headlamp lens has two reference studs projecting therefrom, said radial projection engaging said reference studs so as to locate said motor angularly in a predetermined position with respect to said lens.

* * * * *